United States Patent [19]

Van Dest

[11] Patent Number: 5,173,083
[45] Date of Patent: Dec. 22, 1992

[54] TRANSMISSION JOINT BODY HAVING ARTICULATION ELEMENT RACEWAYS COMPRISING A SURFACE OF A MEMBER MOVABLY MOUNTED IN THE JOINT BODY, AND A METHOD MAKING THE TRANSMISSION JOINT BODY

[75] Inventor: Jean-Claude Van Dest, Saintry sur Seine, France

[73] Assignee: Glaenzer Spicer, Poissy, France

[21] Appl. No.: 712,712

[22] Filed: Jun. 10, 1991

[30] Foreign Application Priority Data

Jun. 21, 1990 [FR] France .................. 90 07787

[51] Int. Cl.⁵ .................. F16C 3/00; F16D 3/26
[52] U.S. Cl. .................. 464/111; 464/181
[58] Field of Search .............. 464/111, 123, 124, 181, 464/905

[56] References Cited

U.S. PATENT DOCUMENTS 2,722,115  11/1955  Dunn .
5,009,628   4/1991  Rouillot .................. 464/111

FOREIGN PATENT DOCUMENTS 0034073  8/1981  European Pat. Off. .
1228149  3/1959  France .
2567222  1/1986  France .
2586767  3/1987  France .

Primary Examiner—Katherine Matecki
Assistant Examiner—William G. Battista, Jr.
Attorney, Agent, or Firm—Wenderoth, Lind & Ponack

[57] ABSTRACT

A transmission joint body has a plurality of bearing passageways for articulation elements distributed around the axis of the body and, each comprising two raceways arranged to cooperate with articulation elements of the transmission joint. Each raceway includes a first surface of a metal member, a second surface of which is associated with a complementary surface of the joint body and, formed in a portion of the joint body. The body is made of a composite material of a reinforced thermosetting or thermoplastic matrix. The second surface of the metal member is capable of displacement relative to the complementary surface of the joint body.

18 Claims, 2 Drawing Sheets

TRANSMISSION JOINT BODY HAVING ARTICULATION ELEMENT RACEWAYS COMPRISING A SURFACE OF A MEMBER MOVABLY MOUNTED IN THE JOINT BODY, AND A METHOD MAKING THE TRANSMISSION JOINT BODY

BACKGROUND OF THE INVENTION

The present invention relates to a transmission-joint body comprising a plurality of bearing passageways for articulation elements in a transmission joint, the passageways being distributed around the axis of the body and each comprising two raceways arranged to cooperate with articulation the elements of the transmission joint. Each raceway consists of a first surface of a piece, a second surface of which is associated with a complementary surface of the joint body, formed in a portion of the body made of a composite material consisting of a reinforced thermosetting or thermoplastic matrix.

A joint body with a composite structure as above is described and shown in French Patent Application No. 88/04,045 published under No. 2,629,157.

SUMMARY OF THE INVENTION

In the various embodiments described and shown in this document, raceways take the form of inserts partially embedded in a composite material for filling a case of a transmission joint body.

The object of the present invention is to provide a transmission joint body of the abovementioned type which has additional degrees of freedom necessary for its kinematics.

To this end, the invention provides a transmission joint body which is characterized in that a second surface of a piece is capable of displacement relative to a complementary surface of the joint body.

According to other features of the invention:
the second surface and the complementary surface are curved surfaces, convex and concave respectively;
the curved surfaces are cylindrical surface portions;
the axis of the concave complementary cylindrical surface portion is parallel to the general axis of the joint body;
the radii of curvature of the cylindrical surface portions are equal;
the generatrices of the first surface of the piece are parallel to the axis of the said second cylindrical surface;
the piece is immobilized axially relative to the joint body; and
the piece comprises two transverse guide faces, perpendicular to the axis of the second cylindrical surface, which are slidably received between two parallel transverse stop surface portions formed in the composite-material portion of the joint body.

The invention also provides a method for producing a joint body in accordance with the teachings of the invention, characterized in that it consists in:

a) using an injection mould having at least one central core;

b) placing the pieces in position on the core via their first surfaces, the other surface portions of the pieces having been previously coated with an anti-adhesive agent; and c) moulding the portion of the joint body made of composite material around the said pieces and the central core.

BRIEF DESCRIPTION OF THE DRAWINGS

Other features and advantages of the invention will become apparent on reading the detailed description which follows, for the understanding of which reference will be made to the accompanying drawings, in which.

DETAILED DESCRIPTION OF THE PREFERRED EMBODIMENT

Figure 1:
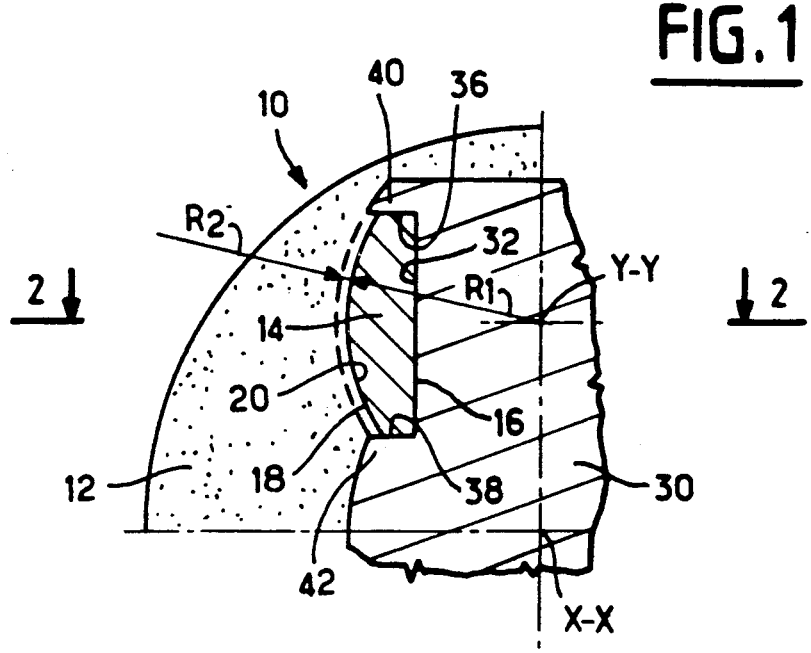
FIG. 1 is a quarter view in axial section taken on line 1—1 of FIG. 2 of part of a joint body according to the invention, shown after completion of a operation for moulding the portion of a joint body made of composite material and before extraction of the central core.

The figures show part of a transmission-joint body 10 belonging to the group of transmission-joint bodies made of composite material, of which a first series of embodiments has been described and shown in French Patent Application FR-A-2,629,157, the contents of which could be referred to in order to become acquainted with the other structural features of the joint body.

The central part of the joint body 10 consists of a portion 12 made of composite material consisting of a thermosetting or thermoplastic matrix reinforced with short fibres or particles.

The joint body 10 comprises rolling or bearing passageways for articulation elements, distributed regularly around the axis X—X of the joint body and each comprising two raceways arranged mutually parallel to cooperate with articulation elements of the transmission joint.

In accordance with the invention, each raceway is a member 14 which is associated with the portion 12 made of composite material so as to be able to be displaced relative to the joint body.

In the embodiment shown in the figures, the metal member 14 is defined longitudinally by a first plane surface 16 which constitutes the actual rolling raceway and by a convex cylindrical surface portion 18 which is provided to cooperate with a complementary concave cylindrical surface portion 20 of the joint body.

The axis of the cylindrical-surface portion 18 is parallel to the plane surface 16.

The axis Y—Y of the concave cylindrical surface portion 20 is parallel to the axis X—X of the joint body 12.

In the embodiment shown in the figures, the radii of curvature of the surface portions 18 and 20 are equal.

The member 14 is defined transversely by two opposite transverse guide faces 22 and 24 which are provided to be slidably received between two parallel transverse stop surface portions 26 and 28 of the portion 12 of the joint body 10.

Figure 3:
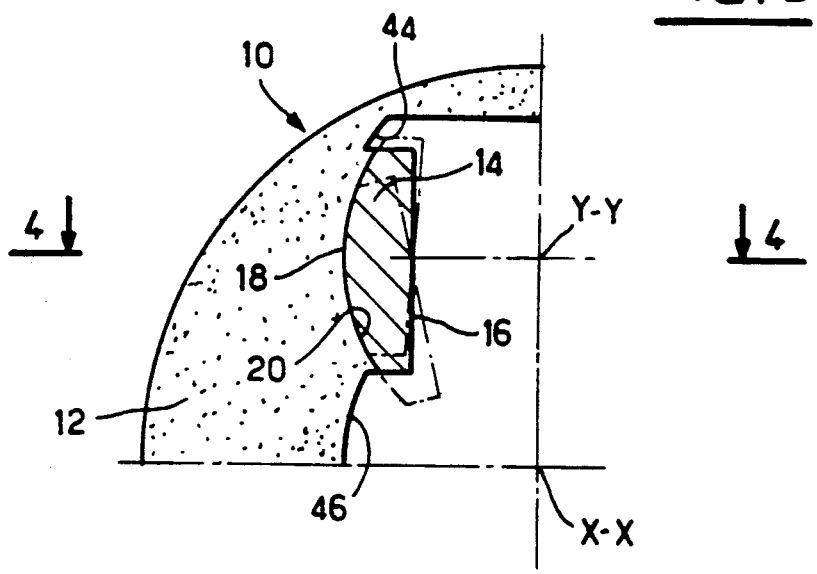
FIGS. 3 and 4 are similar views to those of FIGS. 1 and 2 after extraction of the central core.
Figure 4:
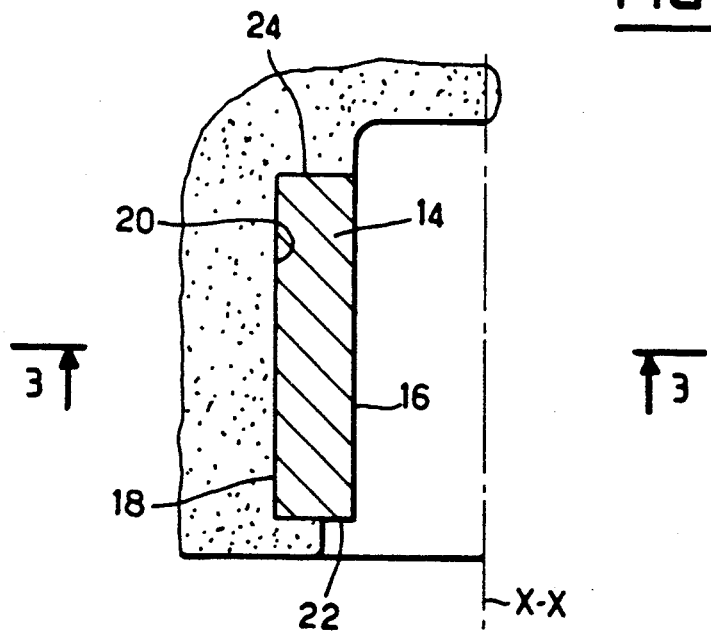

By virtue of this arrangement, the member 14 is able to be displaced relative to the joint body 10 by pivoting about the axis Y—Y on either side of its median position shown in FIGS. 3 and 4, towards angularly offset positions which are illustrated in dot-and-dash lines in FIG. 3.

Figure 2:
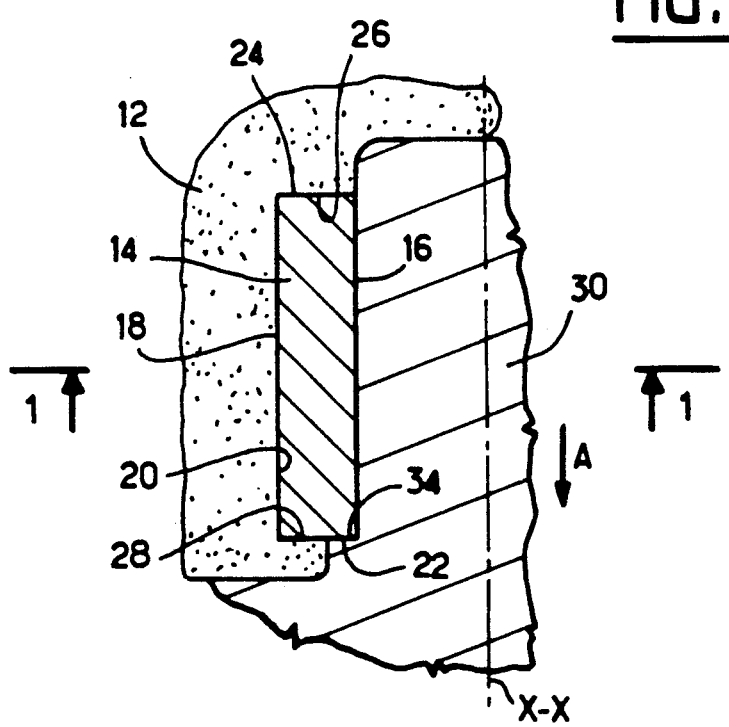
FIG. 2 is a partial sectional view taken on line 2—2 of FIG. 1.

FIGS. 1 and 2 show a portion 30 of a central core of a mould (not shown) which makes it possible to produce, in a particularly advantageous manner, a joint body 10 in accordance with the teachings of the invention.

The central core 30 is of the same type as that described and shown in the abovementioned patent application, and it comprises sets of receptacles 32 in which the metal members 14, which bear against the bottom of these receptacles via their plane surfaces 16, are received. The members 14 are positioned axially relative to the core 30 via their transverse guide surfaces 22, which bear against the corresponding confronting faces 34 of the receptacles 32. Similarly, the member is positioned angularly by the two longitudinal faces 36 and 38 of the receptacle 32 of the core 30.

The radial portions 40 and 42 of the core 30 which define the longitudinal surfaces 36 and 38 of the receptacle 32 extend radially beyond the radius R1 of the convex cylindrical surface 18 of the piece 14, as far as a radius R2, which is greater than the radius R1.

The difference between the radii R1 and R2 makes it possible to produce the clearances 44 and 46 in the portion 12 of the joint body 10 directly by moulding, these clearances subsequently permitting the pivoting of the members 14 (see FIG. 3).

The composite filling material of which the portion 12 is composed is injected into the mould (not shown) around the central core 30, which has been previously equipped with the members 14.

The direct moulding of the composite material on the concave cylindrical surfaces 18 makes it possible to obtain directly the complementary concave cylindrical surfaces 20 upon completion of the moulding operation.

In order to prevent the pieces 14 from adhering to the composite-material portion 12 upon completion of the polymerization, provision is made for coating all the outer surface portions of the members 14 capable of being in contact with the composite material, and also the core, with an anti-adhesive coating. Demoulding is effected by extraction of the core 30 in the direction of the arrow A of FIG. 2, the members 14 remaining in position against the complementary concave cylindrical surfaces 20 and being able to be subsequently displaced relative to the latter by virtue of the existence of the anti-adhesive coating.

The anti-adhesive coating used can be a varnish, a wax, a silicone-based product or any other commonly used mould release agent.

The anti-adhesive coating can be employed only during the moulding operations and then be removed from the members 14, or can constitute a definitive coating for the members 14, such as, for example, a PTFE coating.

The method according to the invention which makes it possible to produce complementary surfaces directly is particularly advantageous, since a perfect conformity of the surfaces is obtained in this way.

The conditions of the surfaces 18 and 20 are likewise of the same quality.

Each transmission-joint body produced according to this method is directly associated with the members 14 which have permitted its production and which are matched to it.

Similarly, the method according to the invention makes it possible to produce directly the transverse stop surfaces for axially retaining the members 14 in the joint body 10.

The invention is not limited to the embodiment which has just been described, and finds application in various types of transmission joints and in various geometric conformations of the surfaces 16 and 18 of the members 14.

I claim:

1. A transmission joint body having a central axis, comprising:
    a plurality of bearing passageways distributed about said central axis, each said bearing passageway comprising two raceways;
    a joint body portion made of a composite material; and
    a plurality of members provided on said joint body portion having first and second surfaces, wherein each said raceway comprises a said first surface of a respective said member; and
    wherein said joint body portion has a complementary surface for each said second surface of said members, each said member being displaceably mounted on said joint body portion for displacement of said member relative to said complementary surface and for pivotal displacement of said member about an axis parallel to said central axis.

2. The transmission joint body of claim 1, wherein said complementary surfaces and said second surfaces are curved surfaces which are concave and convex, respectively.

3. The transmission joint body of claim 2, wherein said curved surfaces are cylindrical portions.

4. The transmission joint body of claim 3, wherein said axis parallel to said central axis is the axis of said complementary surface cylindrical portion.

5. The transmission joint of claim 3, wherein the radius of curvature for each of said cylindrical portions is the same.

6. The transmission joint of claim 3, wherein each said first surface has a generatrix parallel to said second surface.

7. The transmission joint of claim 1, wherein each said member is immobilized on said joint body in the direction of said central axis.

8. The transmission joint body of claim 1, wherein each said member has two transverse guide faces perpendicular to said axis parallel to said central axis, and said joint body portion has two parallel transverse stop surface portions slidably receiving said transverse guide faces therebetween.

9. A transmission joint body, comprising:
    a plurality of bearing passageways distributed about said central axis, each said bearing passageway comprising two raceways;
    a joint body portion made of composite material;
    a plurality of members on said joint body portion, each said member having first and second surfaces, and each said raceway comprising a said first surface of a respective said member for cooperation with an articulation element of a transmission joint; and
    means for mounting each said member on said joint body portion for displacement of each said member relative to said joint body portion, said means including a complementary surface on said joint body portion for each said member receiving a respective said second surface of a said member, said second surfaces being displaceable relative to said complementary surfaces.

10. The transmission joint body of claim 9, wherein said complementary surfaces and said second surfaces are curved surfaces which are concave and convex, respectively.

11. The transmission joint body of claim 10, wherein said curved surfaces are cylindrical portions.

12. The transmission joint body of claim 11, wherein said axis parallel to said central axis is the axis of said complementary surface cylindrical portion.

13. The transmission joint of claim 11, wherein the radius of curvature for each of said cylindrical portions is the same.

14. The transmission joint of claim 11, wherein each said first surface has a generatrix parallel to said second surface.

15. The transmission joint body of claim 9, wherein said means further immobilizes each said member in the direction of said central axis.

16. The transmission joint body of claim 15, wherein each said member has two transverse guide faces perpendicular to said central axis, and said means further comprises two parallel transverse stop surface portions slidably receiving said transverse guide faces therebetween.

17. The transmission joint body of claim 9, wherein said composite material comprises a reinforced matrix of one of a thermosetting and a thermoplastic material.

18. A method of making a transmission joint body, comprising the steps of:
providing an injection mould having at least one central core defining a plurality of bearing passageways distributed around a central axis, each said bearing passageway comprising two raceways;
providing a plurality of metal members having first and second surfaces;
coating said second surfaces of said plurality of metal members with an antiadhesive agent;
placing said plurality of metal members on said central core, said first surfaces forming raceways disposed against said central core at positions thereon defining said raceways; and
injecting a composite material into said injection mould to form a joint body portion around said members and said central core, including complementary surfaces complememtary to said second surfaces of said members.

* * * * *